Dec. 29, 1970  J. LASZLO  3,550,462

LINE ONE GEAR REDUCER

Filed Nov. 8, 1968

INVENTOR
JOSEPH LASZLO
BY SPARROW AND SPARROW
ATTORNEYS 3,550,462
LINE ONE GEAR REDUCER
Joseph Laszlo, New York, N.Y., assignor, by mesne assignments, to International Patents & Development Corporation, a corporation of Delaware
Filed Nov. 8, 1968, Ser. No. 774,237
Int. Cl. F16h 1/06, 1/28, 27/00
U.S. Cl. 74—118                                    10 Claims

ABSTRACT OF THE DISCLOSURE

A mechanical speed reducing device in which a spur gear is driven by two pins in succession. The pins engage the teeth alternately and are situated diametrically opposite to each other. The pins are mounted upon two swivel arms actuated by an eccentric pin on the driving shaft. The swivel arms are confined so that during rotation of the eccentric pin, the two pins engaging the spur gear teeth, pass through radial motion and tangential motion in a predetermined manner for rotating the spur gear and thereby the driven shaft attached to the gear.

BACKGROUND OF THE INVENTION

Heretofore, a worm gear drive arrangement has been used to realize large speed reductions. In such arrangements the worm serves as the driving shaft, whereas the gear is mounted upon the driven shaft. Such worm gear arrangements, however, are extremely inefficient due to the high frictional losses which are incurred. Whereas rotational speed reductions may be obtained through the use of spur gears, a large number of spur gears and their associated mounting parts are required when high speed reductions are to be realized. Thus, spur gear trains require much space through their numerous moving parts and mounting bearings. The present invention provides a rotational speed reducer through which high speed reduction ratios may be realized efficiently.

SUMMARY OF THE INVENTION

A rotational speed reduction device in which an eccentric pin is mounted upon the driving shaft and rotates eccentrically with respect to the axis of the driving shaft. The eccentric pin applies reciprocating motion to two swivel arms which have drive pins at their ends. The swivel arms are confined in motion so that the drive pins execute radial motion and tangential displacement as a result of the reciprocating action applied to the opposite end of the swivel arm by the eccentric pin.

The drive pins engage diametrically opposite teeth of a spur gear. The axis of the spur gear represents the driven axis and is in line with the driving shaft. The drive pins apply rotational movement to the spur gear, as a result of their radial and tangential displacement. The action is such that the two diametrically opposite driving pins engage the teeth of the spur gear alternately in succession and thereby produce rotational motion of the spur gear in the desired direction.

It is an object of the present invention to provide a rotational speed reducer through which high speed reduction ratios may be realized efficiently. It is another object of the present invention to provide such a high speed reduction ratio unit in which the driven shaft is in line with the driving shaft. In particular, it is a further object of the present invention to provide such a speed reduction unit which is compact and adapted for use in conjunction with miniature and fractional horsepower motors.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing, in which

FIG. 2a is a sectional view taken along line 2—2 in FIG. 1 and shows the interrelationship of the driving member and the driven member of the device of FIG. 1;

FIG. 2b is a partial end view and shows another embodiment from the configuration of FIG. 2a.

DESCRIPTION OF THE PREFERRED EMBODIMENTS

Figure 1:
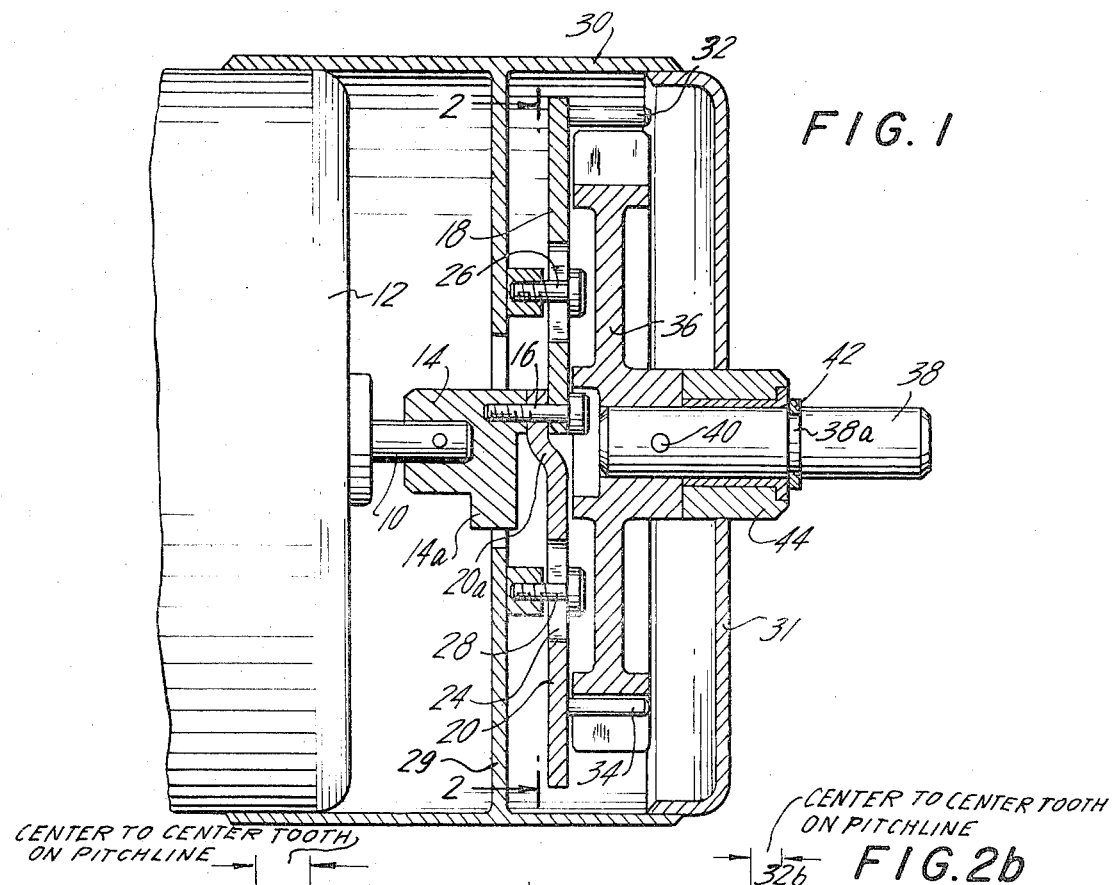
FIG. 1 is a sectional view through the longitudinal axis of the speed reducing device, in accordance with the present invention, and shows the operational elements and their mechanical interrelationships.

Referring to the drawing, the driving shaft 10 of the motor 12 with speed above that desired, has mounted upon it a bushing or eccentric coupling 14 which also serves as a counterweight for an eccentric pin 16 attached to the bushing. The pin 16 passes through the openings at the ends of two swivel arms 18 and 20. The two swivel arms contain oblong slots 22 and 24, for confining the motions of the arms 18 and 20, respectively. Within the two oblong slots 22 and 24, are fixed pins 26 and 28, respectively. These pins 26 and 28 are fixed to a partition 29 of a housing 30 secured to the motor 12.

As the eccentric pin 16 rotates, it applies reciprocating motion to the swivel arms 18 and 20. The ends of the swivel arms opposite to those seated upon the eccentric pin 16, are provided with drive pins 32 and 34. These drive pins engage the teeth of a spur gear 36. The spur gear is mounted upon a shaft 38 which is in line with the shaft 10 of the motor. The shaft 38 carrying the spur gear 36 is the driven shaft and rotates at reduced speed in relation to that of the motor shaft 10. The swivel arm 20 has an offset portion 20a for the purpose of aligning against the face of the spur gear 36, with the remaining portion of the arm. The spur gear 36 is mounted and secured to the shaft 38 through the pin 40. A lock ring 42 assembled to the shaft 38 through a groove 38a in the shaft, secures the latter in the axial direction of the shaft. The bearing 44 formed from a member or end cap 31 of the housing 30, supports the shaft 38.

Figures 2A, 2B:
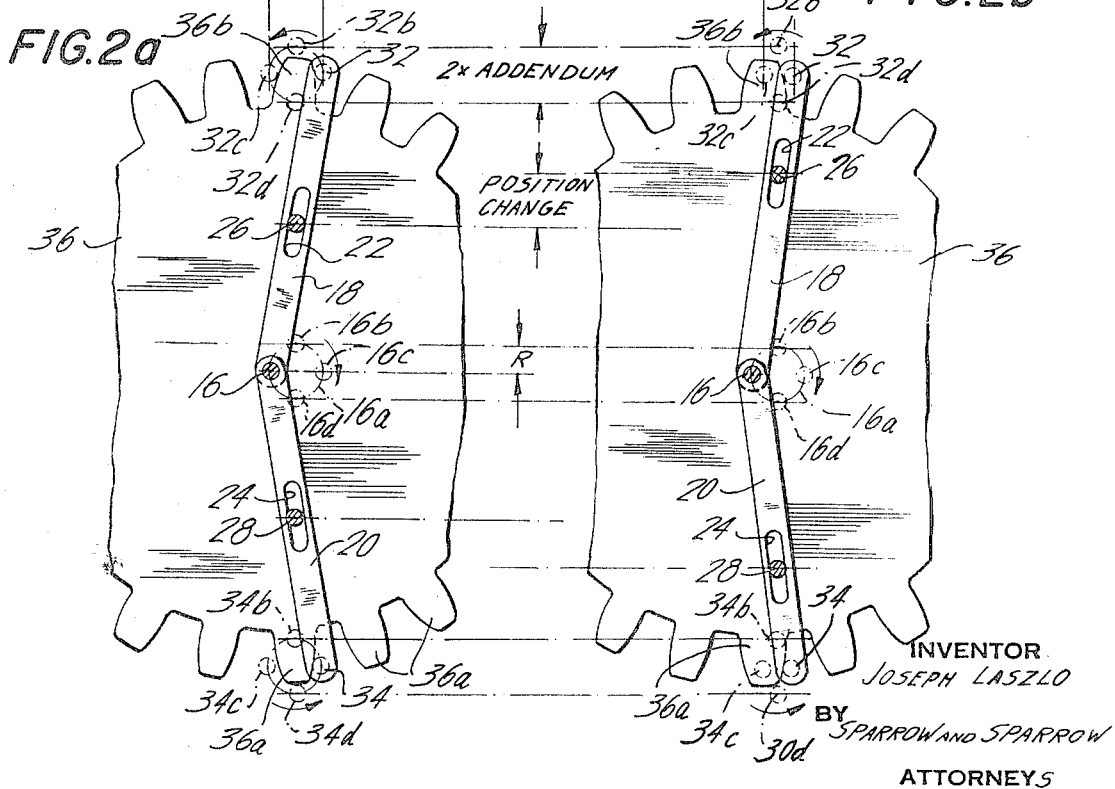

In operation, rotation of the motor shaft 10 causes the eccentric pin 16 to move along the path 16a in FIG. 2a. The eccentricity equal to the radius of this circular path 16a, is equal to the distance between the center of the shaft 10 and the center of the pin 16. For satisfactory operation, this radius R is made equal to the dedendum of the circular pitch gear 36 used. The diameters of the drive pins 32 and 34 are selected so that the pin can be completely engaged between the teeth of the gear. When the eccentric pin 16 is rotated so that the arms 18 and 20 lie along a straight line, one drive pin is fully engaged between the teeth, whereas the other drive pin is fully disengaged and lies outside the path of the teeth.

The slots 22 and 24 within the swivel arms, permit the arms to slide and rotate about the fixed pins 26 and 28.

As a result of this kinematic design, the motion of the drive pins is opposite in direction to the motion of the eccentric pin 16. The radial displacement of the drive pins is a function of the eccentricity or radius R.

The tangential displacement of either pin, on the other hand, is a function of the distance of the swivel pins from the center or axis of the shaft 10. The positions of the pins are adjusted so that the tangential displacement is equal to the center-to-center distance of the gear teeth. Accordingly, when the motor shaft rotates half a revolution and the arm 18 executes a corresponding half revolution with the drive pin 32 fully disengaged and moving in the counterclockwise direction, the drive pin 34 executes half a revolution in the clockwise direction while engaging, for example, the gear tooth 36a. Thus, for the same half revolution of the eccentric pin 16, the drive pin 34 engages the gear tooth 36a, while the drive pin 32 moves entirely free from the gear tooth 36b.

In the next half revolution of the pin 16, the opposite situation occurs with respect to the drive pins 32 and 34, and accordingly two gear teeth are advanced for each revolution of the eccentric pin. As a result, one revolution of the driven gear 36 is equal to the number of revolutions of the motor shaft 10, divided by half the number of teeth on the gear.

In the configuration of FIG. 2b, the swivel pins 26 and 28 are positioned so that the tangential displacement of the drive pins is half the center-to-center distance of the gear teeth. As a result of this, particular positioning of the swivel pins, the pin engaging the gear tooth during half a revolution of the eccentric pin, would advance the gear perimeter by half a tooth. Accordingly, in this configuration of FIG. 2b, the speed ratio for the reduction is equal to the number of teeth on the gear. Expressed in different form, the output speed or driven speed of the gear shaft is equal to the rotational speed of the motor shaft 10, in r.p.m., divided by the number of teeth on the gear.

Thus, the device, in accordance with the present invention, is a flexible one in that a change in the speed reduction ratio by a factor of two may be realized through a mere change in the position of the fixed swivel pins 26 and 28. Changing the position of the swivel pin, produces corresponding changes in the lever arms associated with the swivel arms 18 and 20, and as a result the drive pins 32 and 34 have applied to them corresponding displacement changes.

When thus displacing the fixed swivel pins 26 and 28, the slots 22 and 24 must similarly be displaced along the arms 18 and 20, to permit the slots to move freely about the pins, and thereby apply the desired displacements to the drive pins 32 and 34 relative to the gear teeth 36b and 36a, respectively.

The path 16a of the eccentric pin 16 includes the outline of different positions of the pin 16 in phantom. For these different positions of the pin 16 along the path 16a, corresponding positions are shown in phantom for the drive pins 32 and 34. Thus, as the pin 16 moves clockwise from the position outlined in solid lines in FIG. 2a, to the first position 16b, the drive pin 32 moves to the position 32b, whereas the drive pin 34 moves to the position denoted by 34b. Similarly, the positions 16c and 16d of the eccentric pin 16 correspond to the drive pin positions 32c, 32d, 34c and 34d, respectively.

For the purpose of dynamically balancing the mass rotating about the axis of the motor shaft 10, particularly due to the eccentric pin 16, the bushing or eccentric coupling 14 may be provided with a counterweight portion 14a. Such a counterweight portion, however, may be avoided when the eccentric is formed directly from the motor shaft. At the same time, the small mass involved in the formation of the eccentric pin 16, is sufficiently small so as not to cause noticeable vibrations.

When an internal gear is used in place of the one shown for the members 36 in the drawing, savings in space may be realized since the swivel arms 18 and 20 may be placed directly within the hollow interior of the gear. The ends of these arms may then be shaped so as to contact the gear teeth directly and thereby avoid the use of the pins 32 and 34. At the same time, it is possible to use combinations of both internal and external gears, in which the external gears drive the internal ones. When such combinations are used in two or more stages, reduction ratios of the order of 10,000's may be readily obtained.

What is claimed is:

1. A speed reducing device comprising, in combination, a rotary driving member rotatable about a predetermined driving axis; a rotary driven member rotatable about a predetermined driven axis, and drivable through said driving member at a rotational speed of a predetermined fraction of the rotational speed of said driving member; external gear means secured to said driven member and having a predetermined number of gear teeth; and eccentrically driven linkage means driven eccentrically by said driving member and contacting the external gear teeth of said gear means for advancingly moving said gear means in response to motion of said driving member so that the angular speed of said gear means and said driven member is a predetermined fraction of the angular speed of said driving member, the motion of said linkage means being guided by said gear means.

2. The speed reducing device as defined in claim 1 wherein said gear means is an external spur gear mounted on said rotary driven member and rotating with the angular speed of said driven member.

3. The speed reducing device as defined in claim 1 wherein said driving axis and said driven axis are colinear.

4. The speed reducing device as defined in claim 1 including eccentric coupling means mounted on said driving member and driving eccentrically said eccentrically driven means.

5. The speed reducing device as defined in claim 1 wherein said rotational speed of said driven member is equal to the rotational speed of said driving member divided by one half the number of gear teeth on said gear means.

6. The speed reducing device as defined in claim 1 wherein said rotational speed of said driven member is equal to the rotational speed of said driving member divided by the number of gear teeth on said gear means.

7. The speed reducing device as defined in claim 1 wherein the direction of rotation of said driven member is identical to the direction of rotation of said driving member.

8. A speed reducing device comprising, in combination, a rotary driving member rotatable about a predetermined driving axis; a rotary driven member rotatable about a predetermined driven axis, and drivable through said driving member at a rotational speed of a predetermined fraction of the rotational speed of said driving member; gear means secured to said driven member and having a predetermined number of gear teeth; and eccentrically driven means driven eccentrically by said driving member and contacting said gear means for advancingly moving said gear means in response to motion of said driving member so that the angular speed of said gear means and said driven member is a predetermined fraction of the angular speed of said driving member, said eccentrically driven means comprising at least two arms coupled at one end to said driving member and contactingly moving said gear means at the other end, said one end having eccentric motion applied by said driving member.

9. The speed reducing device as defined in claim 8 wherein said arms include slotted openings movable about fixed pins projecting into said slotted openings, said fixed pins being pivoting fulcrums for said arms.

10. The speed reducing device as defined in claim 9 including drive pin means at said other end of said arms for contactingly moving said gear means by engaging the gear teeth of said gear means during rotation of said driving member.

References Cited

UNITED STATES PATENTS

| | | | |
|---|---|---|---|
| 1,060,814 | 5/1913 | Burgum | 74—415 |
| 1,079,048 | 11/1918 | Homans | 74—116 |
| 3,258,994 | 7/1966 | Gorfin | 74—800 |

LEONARD H. GERIN, Primary Examiner

U.S. Cl. X.R.

74—415, 800